United States Patent
Hsu et al.

(10) Patent No.: US 11,486,088 B2
(45) Date of Patent: Nov. 1, 2022

(54) ANTI-STAINING RESIN, ANTI-STAINING FABRIC AND FABRICATING METHOD THEREOF

(71) Applicant: TAIWAN TEXTILE RESEARCH INSTITUTE, New Taipei (TW)

(72) Inventors: Chen-Shou Hsu, New Taipei (TW); Sun-Wen Juan, New Taipei (TW); Chun-Hung Lin, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 0 days.

(21) Appl. No.: 17/144,253

(22) Filed: Jan. 8, 2021

(65) Prior Publication Data

US 2022/0010484 A1    Jan. 13, 2022

(30) Foreign Application Priority Data

Jul. 13, 2020  (TW) .................................. 109123621

(51) Int. Cl.
| | | |
|---|---|---|
| *D06N 3/12* | (2006.01) | |
| *C08G 65/333* | (2006.01) | |
| *C09D 175/12* | (2006.01) | |
| *C08G 18/08* | (2006.01) | |
| *C08G 18/28* | (2006.01) | |
| *C08G 18/80* | (2006.01) | |
| *C08G 18/32* | (2006.01) | |
| *C08G 18/48* | (2006.01) | |
| *C08G 18/79* | (2006.01) | |

(52) U.S. Cl.
CPC ........... *D06N 3/12* (2013.01); *C08G 18/0814* (2013.01); *C08G 18/285* (2013.01); *C08G 18/3203* (2013.01); *C08G 18/4833* (2013.01); *C08G 18/791* (2013.01); *C08G 18/807* (2013.01); *C08G 65/33396* (2013.01); *C09D 175/12* (2013.01); *D06N 2209/147* (2013.01)

(58) Field of Classification Search
None
See application file for complete search history.

(56) References Cited

U.S. PATENT DOCUMENTS

| | | |
|---|---|---|
| 9,260,605 B2 | 2/2016 | Sworen et al. |
| 9,708,757 B2 | 7/2017 | Viladot Petit et al. |
| 2009/0029140 A1 | 1/2009 | Haberle et al. |
| 2012/0045496 A1* | 2/2012 | Short ..................... D06N 3/128 424/404 |
| 2014/0295724 A1 | 10/2014 | Sworen et al. |
| 2016/0194821 A1 | 7/2016 | Jost |
| 2019/0256739 A1 | 8/2019 | Brown et al. |

FOREIGN PATENT DOCUMENTS

| | | |
|---|---|---|
| CN | 101379240 A | 3/2009 |
| CN | 105358760 A | 2/2016 |
| CN | 107675278 A | 2/2018 |
| EP | 3 460 021 A1 | 3/2019 |
| WO | 2014160905 A1 | 10/2014 |
| WO | 2015191326 A1 | 12/2015 |

* cited by examiner

*Primary Examiner* — Christopher M Rodd
(74) *Attorney, Agent, or Firm* — McClure, Qualey & Rodack, LLP

(57) ABSTRACT

An anti-staining fabric includes a base cloth and an anti-staining resin. The anti-staining resin is disposed on the base cloth, in which a method of fabricating the anti-staining resin includes the following steps. A first thermal process is performed to mix a polyol, a cross-linking agent, and a choline to form a first mixture, in which a reaction temperature of the first thermal process is between 90° C. and 120° C. A second thermal process is performed to mix the first mixture and a chain extender to form the anti-staining resin, in which the chain extender includes a first reagent and a second reagent, and a reaction temperature of the second thermal process is between 120° C. and 150° C.

11 Claims, 1 Drawing Sheet

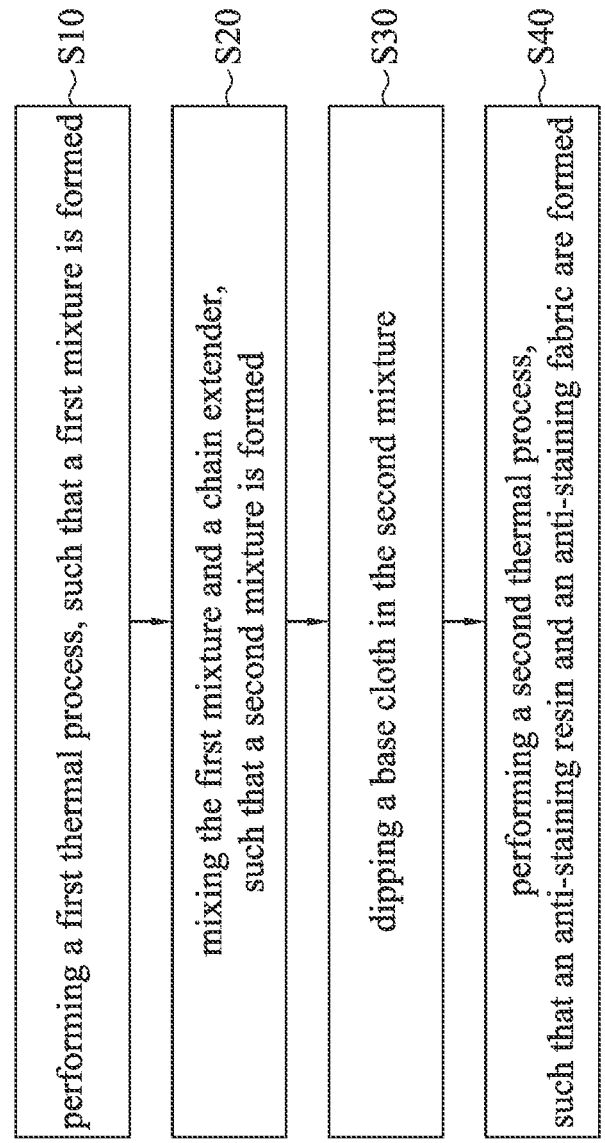

ANTI-STAINING RESIN, ANTI-STAINING FABRIC AND FABRICATING METHOD THEREOF

RELATED APPLICATION

This application claims priority to Taiwan Application Serial Number 109123621, filed Jul. 13, 2020, which is herein incorporated by reference.

BACKGROUND

Field of Invention

The present disclosure relates to a textile material, and particularly relates to an anti-staining resin, an anti-staining fabric fabricated by the anti-staining resin, and a fabricating method of the anti-staining fabric.

Description of Related Art

With the improvement of the living standard in today's society, people's demand for functional textiles gradually increases, and with the continuous coming out of the various functional textiles, the development of the functional textiles with specific purposes has also become more and more complete.

People in today's society often do not have too much time and effort to clean the stained clothing due to their busy work, and sometimes the clothing are even accumulated for several days without being washed. As such, stains are easily embedded in the fibers and difficult to be removed. Therefore, there is a need for clothing with anti-staining and antibacterial effects to increase the convenience of daily life. However, the functions of most of the textiles on the market having anti-staining and antibacterial effects are often unable to be maintained, and as the number of wearing times increases, the anti-staining and antibacterial effects of the textiles will gradually degrade, failing to meet the users' needs. Therefore, how to improve and maintain the anti-staining and antibacterial effects of the textiles is still an important issue for the textile industry.

SUMMARY

According to some embodiments of the present disclosure, an anti-staining fabric includes a base cloth and an anti-staining resin. The anti-staining resin is disposed on the base cloth, in which a fabricating method of the anti-staining resin includes the following steps. Performing a first thermal process to mix a polyol, a cross-linking agent, and a choline, such that a first mixture is formed, in which a reaction temperature of the first thermal process is between 90° C. and 120° C. Performing a second thermal process to mix the first mixture and a chain extender, such that the anti-staining resin is formed, in which the chain extender includes a first reagent and a second reagent, and a reaction temperature of the second thermal process is between 120° C. and 150° C.

In some embodiments of the present disclosure, the cross-linking agent and the second reagent are the same compound.

In some embodiments of the present disclosure, the cross-linking agent includes a structural unit represented by formula (1),

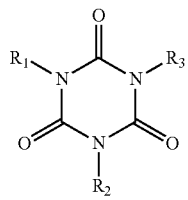

formula (1), in which any two or more of the $R_1$, $R_2$, and $R_3$ includes a structural unit represented by formula (2), formula (2).

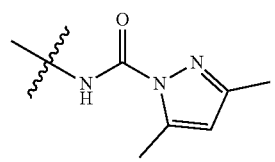

In some embodiments of the present disclosure, the base cloth has a plurality of yarns interwoven with each other, and the anti-staining resin wraps each of the yarns.

In some embodiments of the present disclosure, the base cloth has at least two layers, and the anti-staining resin is disposed between the two layers of the base cloth.

According to some embodiments of the present disclosure, a fabricating method of an anti-staining resin includes the following steps. Performing a first thermal process to mix a polyol, a cross-linking agent, and a choline, such that a first mixture is formed, in which a reaction temperature of the first thermal process is between 90° C. and 120° C. Mixing the first mixture and a chain extender, such that a second mixture is formed, in which the chain extender includes a first reagent and a second reagent. Dipping a base cloth in the second mixture, such that the second mixture covers the base cloth and infiltrates into the base cloth. Performing a second thermal process, such that the second mixture is formed into an anti-staining resin, and the anti-staining resin is disposed on the base cloth, in which a reaction temperature of the second thermal process is between 120° C. and 150° C.

In some embodiments of the present disclosure, during the first thermal process, the cross-linking agent reacts with the polyol and the choline, such that the first mixture is formed.

In some embodiments of the present disclosure, performing the first thermal process includes the following steps. Performing a first front-end thermal process to mix the polyol and the cross-linking agent, such that a first precursor is formed. Performing a first back-end thermal process to mix the choline and the first precursor, such that the first mixture is formed.

In some embodiments of the present disclosure, a reaction time of the first thermal process is between 20 minutes and 30 minutes, and a reaction time of the second thermal process is between 2 minutes and 5 minutes.

According to some embodiments of the present disclosure, an anti-staining resin is fabricated by a fabricating method including the following steps. Performing a first thermal process to mix a polyol, a cross-linking agent, and a choline, such that a first mixture is formed, in which a reaction temperature of the first thermal process is between 90° C. and 120° C. Performing a second thermal process to mix the first mixture and a chain extender, such that the anti-staining resin is formed, in which the chain extender includes a first reagent and a second reagent, and a reaction temperature of the second thermal process is between 120° C. and 150° C.

In some embodiments of the present disclosure, the first reagent is pentaerythritol, and the cross-linking agent and the second reagent are the same compound.

In some embodiments of the present disclosure, an average molecular weight of the polyol is between 300 g/mole and 8000 g/mole.

In the aforementioned embodiments of the present disclosure, the anti-staining fabric of the present disclosure includes the base cloth and the anti-staining resin, and the anti-staining resin is firmly disposed on the base cloth, thereby improving the moisture-absorbing and quick-drying properties, the anti-staining and antibacterial effects, and the washing fastness of the anti-staining fabric. During the fabricating process of the anti-staining fabric, the cross-linking agent can be ensured to undergo a segmented reaction by adjusting the reaction temperature of each stage of the two-stage thermal process, such that the subsequently formed anti-staining resin has a complicated network structure and is firmly disposed on the base cloth, which is beneficial for improving the moisture-absorbing and quick-drying properties, the anti-staining and antibacterial effects, and the washing fastness of the anti-staining fabric. Accordingly, the anti-staining fabric of the present disclosure can still maintain its functions well after multiple times of washing, and can be widely used in the field of functional apparel textiles.

BRIEF DESCRIPTION OF THE DRAWINGS

The disclosure can be more fully understood by reading the following detailed description of the embodiments, with reference made to the accompanying drawings as follows:

FIG. 1 is a flowchart illustrating a fabricating method of an anti-staining fabric according to some embodiments of the present disclosure.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In the present disclosure, the structure of a polymer or a functional group is sometimes represented by a skeleton formula. This representation can omit carbon atoms, hydrogen atoms, and carbon-hydrogen bonds. Certainly, if the atom or atom group is clearly drawn in the structural formula, the drawing shall prevail.

The present disclosure provides an anti-staining resin which can be firmly disposed on a base cloth, such that the moisture-absorbing and quick-drying properties, the anti-staining and antibacterial effects, and the washing fastness of the anti-staining fabric fabricated by the anti-staining resin can be improved. Compared to the conventional anti-staining fabric, the anti-staining fabric of the present disclosure can still well maintain its moisture-absorbing and quick-drying properties and its anti-staining and antibacterial effects after multiple times of washing, thereby effectively solving the problem of poor washing fastness and short lifespan of the conventional anti-staining fabric.

FIG. 1 is a flowchart illustrating a fabricating method of an anti-staining fabric according to some embodiments of the present disclosure. Reference is made to FIG. 1. The fabricating method of the anti-staining fabric includes steps S10, S20, S30, and S40. In step S10, a first thermal process is performed, such that a first mixture is formed. In step S20, the first mixture and a chain extender are mixed, such that a second mixture is formed. In step S30, a base cloth is dipped in the second mixture. In step S40, a second thermal process is performed, such that the anti-staining resin and the anti-staining fabric are formed. The aforementioned steps will further be discussed in the following descriptions.

Firstly, a polyol, a cross-linking agent, and a choline are provided. In some embodiments, the polyol may be, for example, polyethylene glycol (PEG), polypropylene glycol (PPG), poly(tetramethylene ether) glycol (PTMEG), or combinations thereof. In some embodiments, an average molecular weight of the polyol may be between 300 g/mole and 8000 g/mole.

In some embodiments, the cross-linking agent may include isocyanate trimer. Specifically, the cross-linking agent may include a structural unit represented by formula (1),

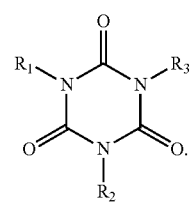

formula (1)

In some embodiments, the cross-linking agent may include aliphatic isocyanate (e.g., HDI, TMDI or XDI) trimer, alicyclic isocyanate (e.g., IPDI, HMDI or HTDI) trimer, aromatic isocyanate (e.g., TDI or MDI) trimer, or combinations thereof. In some embodiments, at least two terminals of the isocyanate trimer may have functional groups such as 3,5-dimethylpyrazole (DMP). Specifically, in the cross-linking agent represented by formula (1), any two or more of R1, R2, and R3 include a structural unit represented by formula (2),

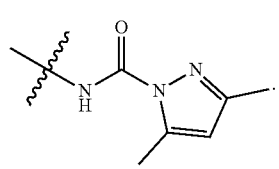

formula (2)

In some embodiments, choline may be, for example, an alcohol (amine) having a zwitterionic group. Specifically, choline may include a structural unit represented by formula (3),

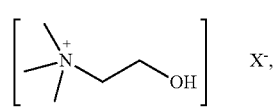

formula (3)

in which $X^-$ may be, for example, a counterion that keeps the choline neutral, such as $Cl^-$, $OH^-$, or tartrate. The zwitterionic group of the choline can be preserved in the anti-staining resin formed subsequently to provide the anti-staining resin with good moisture-absorbing and quick-drying properties and anti-staining and antibacterial effects.

Next, the first thermal process is performed in step S10 to mix the polyol, the cross-linking agent, and the choline, such that the first mixture is formed, in which a reaction temperature of the first thermal process is between 90° C. and 120° C. In some embodiments, a usage amount of the polyol may be between 1 part by weight and 25 parts by weight, a usage amount of the cross-linking agent may be between 55 parts by weight and 75 parts by weight, and a usage amount of choline may be between 1 part by weight and 10 parts by weight. In some embodiments, a reaction time of the first thermal process may be between 20 minutes and 30 minutes, so as to ensure that the reaction proceeds to a certain extent. In some embodiments, performing the first thermal process may include sequentially performing a first front-end thermal process and a first back-end thermal process.

In some embodiments, the step of the first front-end thermal process includes mixing the polyol and the cross-linking agent to form a first precursor. In detail, during the first front-end thermal process, the cross-linking agent can react with the polyol to form the first precursor. In some embodiments, a reaction time of the first front-end thermal process may be between 10 minutes and 20 minutes. As mentioned above, since in some embodiments, the average molecular weight of the polyol may be between 300 g/mole and 8000 g/mole, the anti-staining fabric formed subsequently can have good moisture-absorbing and quick-drying properties, anti-staining and antibacterial effects, washing fastness, and softness, and the manufacturing costs can be effectively reduced. Specifically, if the average molecular weight of the polyol is less than 300 g/mole, the anti-staining resin formed subsequently may not be firmly disposed on the base cloth, and hence the anti-staining fabric has poor moisture-absorbing and quick-drying properties, anti-staining and antibacterial effects, and washing fastness; and if the average molecular weight of the polyol is greater than 8000 g/mole, the anti-staining fabric may have poor softness, and the required reaction time is likely to increase, which is not beneficial for reducing the manufacturing costs.

In some embodiments, the step of the first back-end thermal process includes mixing the first precursor and the choline to form the first mixture. In detail, during the first back-end thermal process, the unreacted cross-linking agent and/or the first precursor may further react with the polyol and/or the choline to form the first mixture. In some embodiments, a reaction time of the first back-end thermal process may be between 5 minutes and 15 minutes. In some embodiments, since the polyol may have a larger average molecular weight than the choline, the polyol is preferentially selected for reaction during the first thermal process, such that the reaction is ensured to proceed completely, thereby avoiding the oily substance formed by the unreacted polyol from further affecting the fabrication of the anti-staining fabric.

Then, mixing the first mixture and the chain extender in step S20 to form a second mixture, in which the chain extender includes a first reagent and a second reagent. The chain extender can increase the chain length and the cross-linking degree of the anti-staining resin during the subsequent thermal process, such that the anti-staining resin is even more firmly disposed on the base cloth to improve the moisture-absorbing and quick-drying properties, anti-staining and antibacterial effects, and washing fastness of the anti-staining fabric. In some embodiments, a usage amount of the chain extender may be between 10 parts by weight and 25 parts by weight, in which a usage amount of the first reagent may be between 2 parts by weight and 10 parts by weight, and a usage amount of the second reagent may be between 8 parts by weight and 15 parts by weight.

In some embodiments, the first reagent may be, for example, pentaerythritol. In other embodiments, the first reagent can be, for example, ethylene glycol, propylene glycol, 1,3-butanediol, 1,4-butanediol, pentanediol, hexanediol, octanediol, triethylene glycol, tetraethylene glycol, glycerol, trimethylolmethane, trimethylolethane, xylitol, sorbitol, sucrose, or combinations thereof. In some embodiments, the second reagent may include isocyanate trimer. Specifically, the second reagent may include a structural unit represented by formula (1),

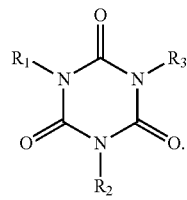

formula (1)

In some embodiments, the second reagent may include aliphatic isocyanate (e.g., HDI, TMDI or XDI) trimer, alicyclic isocyanate (e.g., IPDI, HMDI or HTDI) trimer, aromatic isocyanate (e.g., TDI or MDI) trimer, or combinations thereof. In some embodiments, at least two terminals of the isocyanate trimer may have functional groups such as 3,5-dimethylpyrazole (DMP). Specifically, in the second reagent represented by formula (1), any two or more of R1, R2, and R3 include a structural unit represented by formula (2),

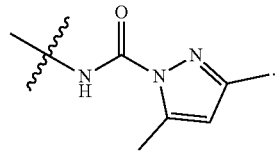

formula (2)

In some embodiments, the second reagent and the aforementioned cross-linking agent are the same compound.

After that, dipping the base cloth in the second mixture in step S30, such that the second mixture covers the base cloth and infiltrates into the base cloth, in which the base cloth may include knitted fabric, woven fabric, non-woven fabric, etc. In detail, when the base cloth is dipped in the second mixture, each ingredient in the second mixture can be attached to the surface of each fiber or yarn. In some embodiments, a base material of the base cloth may be, for example, polyethylene terephthalate, so as to prevent the base cloth from chemically reacting with the ingredients in the second mixture during the subsequent thermal process. In some embodiments, double rollers may be used in a padding process of the base cloth after dipping, so as to remove the excess second mixture on the surface of the base cloth.

Next, the second thermal process is performed in step S40 to form the anti-staining resin and the anti-staining fabric, in which a reaction temperature of the second thermal process is between 120° C. and 150° C. In some embodiments, the reaction time of the second thermal process may be between 2 minutes and 5 minutes, so as to meet the requirements of the post-treatment of the industry. In detail, during the second thermal process, the ingredients in the second mixture attached to the surface of the yarn can react with each other to crosslink with each other, so as to form the anti-staining resin, and the anti-staining resin can be firmly disposed on the base cloth to form the anti-staining fabric. For example, during the second thermal process, the second reagent in the chain extender and the unreacted cross-linking agent in the first thermal process can respectively undergo a cross-linking reaction. For another example, each of the ingredients in the first mixture may also undergo a cross-linking reaction during the second thermal process.

In some embodiments, the base cloth of the anti-staining fabric has at least two layers. Specifically, the interlayers of the base cloth may be three-dimensional spaces naturally formed by yarns or fibers after being interwoven or stacked, and the yarns or fibers may be interwoven or entangled between the two layers of the base cloth. For example, when the base cloth of the anti-staining fabric is a woven fabric, the interlayers of the base cloth may be three-dimensional spaces formed by separating the warp yarns by the weft yarns. For another example, when the base cloth of the anti-staining fabric is a knitted fabric, the interlayers of the base cloth may be three-dimensional spaces formed after interlacing the yarns into knitted loops. For further examples, when the base cloth of the anti-staining fabric is a non-woven fabric, the interlayers of the base cloth may be gaps formed by the stacking of yarns (or fibers). In some embodiments, the anti-staining resin is disposed between the two layers of the base cloth to be firmly disposed on the base cloth. In this regard, the anti-staining fabric can also wrap each yarn or fiber of the base cloth, so as to be disposed between the two layers of the base cloth.

After performing the above steps S10 to S40, the anti-staining fabric of the present disclosure can be obtained, and the anti-staining resin in the anti-staining fabric is firmly disposed on the base cloth. Since the anti-staining resin in the anti-staining fabric has zwitterionic groups derived from the choline, it can have good a moisture-absorbing property to achieve a quick-drying effect. In addition, the anti-staining resin with zwitterionic groups can have good anti-staining and antibacterial functions. Furthermore, the anti-staining resin formed by the two-stage thermal process can form a complicated network structure on the fibers or yarns of the base cloth, such that the anti-staining resin is even more firmly disposed on the base cloth. Accordingly, the formed anti-staining fabric can be ensured to have moisture-absorbing and quick-drying properties, anti-staining and antibacterial effects, and washing fastness.

It should be particularly noted that by the selection of the cross-linking agent and the setting of the reaction temperature of each of the first and second thermal processes in the present disclosure, the cross-linking agent and its derivatives produced during the thermal process can be ensured to undergo a segmented reaction. In detail, since the cross-linking agent of the present disclosure only partially reacts at a temperature of 90° C. to 120° C., and can completely react at a temperature of 120° C. to 150° C., the reaction temperatures of the first and second thermal processes are respectively set in the above range to ensure that portions of the cross-linking agent is preserved for a cross-linking reaction during the second thermal process. Accordingly, the subsequently formed anti-staining resin can have a complicated network structure, which is beneficial for improving the moisture-absorbing and quick-drying properties, anti-staining and antibacterial effects, and washing fastness. Similarly, by the selection of the second reagent and the setting of the reaction temperature of the second thermal process, the second reagent is ensured to be completely reacted during the second thermal process, such that the cross-linking reaction is facilitated.

In the following descriptions, features and effects of the present disclosure will be described more specifically with reference to some embodiments and comparative examples. It is noted that without exceeding the scope of the present disclosure, the materials used, their amount and ratio, processing details, processing flow, etc. can be appropriately alternated. Therefore, the present disclosure should not be interpreted restrictively by the embodiments provided below. The ingredients and their contents in each embodiment and comparative example are shown in Table 1. Each embodiment is fabricated through the aforementioned steps S10 to S40, in which the reaction temperature of the first thermal process is 110° C., and the reaction temperature of the second thermal process is 130° C.

TABLE 1

| | base cloth | polyol | cross-linking agent | choline | chain extender first reagent | second reagent |
|---|---|---|---|---|---|---|
| comparative example 1 | PET knitted fabric | N/A | N/A | N/A | N/A | N/A |
| embodiment 1 | PET knitted fabric | PEG M.W. 300 (1) | water-based bridging agent (75) | (6) | pentaerythritol (3) | water-based bridging agent (15) |
| embodiment 2 | PET knitted fabric | PPG M.W. 3000 (10) | water-based bridging agent (66) | (10) | pentaerythritol (4) | water-based bridging agent (10) |
| embodiment 3 | PET knitted fabric | PTMEG M.W. 3000 (10) | water-based bridging agent (66) | (5) | pentaerythritol (9) | water-based bridging agent (10) |
| embodiment 4 | PET knitted fabric | PPG M.W. 3000 (10) | WR611 (67) | (5) | pentaerythritol (8) | WR611 (10) |

TABLE 1-continued

| | base cloth | polyol | cross-linking agent | choline | chain extender first reagent | second reagent |
|---|---|---|---|---|---|---|
| embodiment 5 | PET knitted fabric | PPG M.W. 3000 (10) | WR621 (66) | (7) | pentaerythritol (7) | WR621 (10) |
| embodiment 6 | PET knitted fabric | PPG M.W. 3000 (16) | BI-201 (60) | (10) | pentaerythritol (4) | BI-201 (10) |

Note 1:
The contents are shown in parentheses, and the unit of the content is parts by weight.
Note 2:
PEG (M.W. 300 and 3000) are purchased from Merk; PEG (M.W. 8000), PPG (M.W. 3000), and PTMEG (M.W. 3000) are purchased from Bayer.
Note 3:
Water-based bridging agent is purchased from Taiwan Textile Research Institute; WR611 and WR621 are product names, which are purchased from Great Eastern Resins Industrial Co., Ltd.; BI-201 is a product name, which is purchased from An Fong Development Co., Ltd.
Note 4:
Pentaerythritol is purchased from Aldrich.
Note 5:
The term "M.W." stands for "molecular weight".

<Experiment 1: Moisture-Absorbing and Drying Test and Anti-Staining Test for Fabrics>

The moisture-absorbing and drying test (including drying time and drying rate tests) for each embodiment and comparative example 1 is performed under the AATCC 201 standard method, and the anti-staining test for each embodiment and comparative example 1 is performed under the AATCC 130 standard method. Among them, embodiments 1 to 5 have further been subjected to 50 times of washing, and the tests were performed again after 50 times of washing. The results are shown in Table 2.

TABLE 2

| | number of washing (times) | moisture-absorbing and drying test | | anti-staining test (grade) |
|---|---|---|---|---|
| | | drying time (min) | drying rate (ml/hr) | |
| comparative example 1 | 0 | 7.5 | 1.6 | 2-3 |
| embodiment 1 | 0 | 5.9 | 2.0 | 4-5 |
| | 50 | 7.3 | 1.6 | 4-5 |
| embodiment 2 | 0 | 4.9 | 2.5 | 4-5 |
| | 50 | 5.3 | 2.3 | 4-5 |
| embodiment 3 | 0 | 6.6 | 1.8 | 4-5 |
| | 50 | 11.6 | 1.0 | 4 |
| embodiment 4 | 0 | 6.4 | 1.9 | 3-4 |
| | 50 | 10.6 | 1.1 | 3 |
| embodiment 5 | 0 | 6.7 | 1.8 | 4 |
| | 50 | 6.7 | 1.8 | 3-4 |
| embodiment 6 | 0 | 5.9 | 2.0 | 3-4 |

As shown in Table 2, before washing, each embodiment shows better moisture-absorbing and drying abilities than comparative example 1, indicating that the anti-staining fabric of the present disclosure is suitable for various moisture-absorbing, quick-drying, and anti-staining products (e.g., sportswear). In addition, the moisture-absorbing and drying performances of embodiments 1, 2, and 5 after 50 times of washing are still better than those of comparative example 1 before washing, and the anti-staining performance of embodiments 1 to 5 after 50 times of washing is still better than that of comparative example 1 before washing, which successfully overcomes the problem of poor washing fastness caused by the use of conventional processing additives.

<Experiment 2: Drying Rate Test for Fabrics>

The drying rate test for embodiments 2, 4, 5, and 6 and comparative example 1 is performed under the FTTS-FA-004 standard method. The results are shown in Table 3.

TABLE 3

| drying time (min) | comparative example 1 | embodiment 2 | embodiment 4 | embodiment 5 | embodiment 6 |
|---|---|---|---|---|---|
| | residual moisture ratio (%) | | | | |
| 0 | 100.0 | 100.0 | 100.0 | 100.0 | 100.0 |
| 5 | 94.5 | 85.5 | 87.8 | 86.7 | 83.9 |
| 10 | 85.4 | 73.4 | 76.7 | 74.9 | 68.8 |
| 15 | 75.6 | 62.1 | 65.7 | 64.5 | 55.8 |
| 20 | 65.2 | 50.7 | 54.4 | 54.0 | 42.1 |
| 25 | 54.8 | 39.1 | 43.9 | 43.3 | 30.6 |
| 30 | 44.1 | 28.4 | 33.3 | 33.7 | 19.6 |
| 35 | 34.2 | 19.8 | 22.6 | 23.3 | 11.5 |
| 40 | 24.1 | 12.9 | 13.4 | 14.1 | 6.5 |

As shown in Table 3, embodiments 2, 4, 5, and 6 have significantly lower residual moisture ratio than comparative example 1 after experiencing the same drying time, indicating better moisture-absorbing and drying effects. In addition, the residual moisture ratio of embodiments 2 and 6 at the $40^{th}$ minute is less than 13.0%, reaching the level 5 specified by the FTTS-FA-004 standard method, indicating excellent moisture-absorbing and drying abilities.

<Experiment 3: Antibacterial Test for Fabrics>

The antibacterial test of ATCC 6538 *Staphylococcus aureus* for embodiment 2 after 50 times of washing is performed under the AATCC 100-2012 standard method. The results are shown in Table 4.

TABLE 4

| | results |
|---|---|
| instant-flushed bacteria quantity | $1.52 \times 10^5$ |
| after-cultured bacteria quantity | <100 |
| sterilization reduction (%) | >99.9 |

As shown in Table 4, example 2 can still achieve a sterilization reduction of greater than 99.9% after 50 times of washing, indicating good antibacterial effect and washing fastness.

According to the aforementioned embodiments of the present disclosure, the anti-staining fabric of the present disclosure includes the base cloth and the anti-staining resin firmly disposed on the base cloth, thereby improving the moisture-absorbing and quick-drying properties, the anti-staining and antibacterial effects, and the washing fastness of the anti-staining fabric. During the fabricating process of the anti-staining fabric, the cross-linking agent can be ensured to undergo a segmented reaction by adjusting the reaction temperature of each stage of the two-stage thermal process, such that the subsequently formed anti-staining resin has a complicated network structure and is firmly disposed on the base cloth, which is beneficial for improving the moisture-absorbing and quick-drying properties, the anti-staining and antibacterial effects, and the washing fastness of the anti-staining fabric. Accordingly, the anti-staining fabric of the present disclosure can still maintain its functions well after multiple times of washing, and can be widely used in the field of functional apparel textiles.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. An anti-staining resin, fabricated by a fabricating method comprising the following steps:
    performing a first thermal process, such that a polyol, a cross-linking agent, and a choline are reacted to form a first mixture, wherein a reaction temperature of the first thermal process is between 90° C. and 120° C.; and
    performing a second thermal process, such that the first mixture and a chain extender are reacted to form the anti-staining resin, wherein the chain extender comprises a first reagent and a second reagent, and a reaction temperature of the second thermal process is between 120° C. and 150° C.

2. The anti-staining resin of claim 1, wherein the first reagent is pentaerythritol, and the cross-linking agent and the second reagent are the same compound.

3. The anti-staining resin of claim 1, wherein an average molecular weight of the polyol is between 300 g/mole and 8000 g/mole.

4. An anti-staining fabric, comprising:
    a base cloth;
    an anti-staining resin disposed on the base cloth, wherein a fabricating method of the anti-staining resin comprises:
        performing a first thermal process, such that a polyol, a cross-linking agent, and a choline are reacted to form a first mixture, wherein a reaction temperature of the first thermal process is between 90° C. and 120° C.; and
        performing a second thermal process, such that the first mixture and a chain extender are reacted to form the anti-staining resin, wherein the chain extender comprises a first reagent and a second reagent, and a reaction temperature of the second thermal process is between 120° C. and 150° C.

5. The anti-staining fabric of claim 4, wherein the cross-linking agent and the second reagent are the same compound.

6. The anti-staining fabric of claim 4, wherein the cross-linking agent comprises a structural unit represented by formula (1),

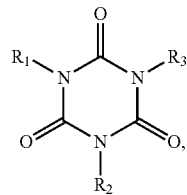

formula (1)

wherein any two or more of the $R_1$, $R_2$, and $R_3$ comprises a structural unit represented by formula (2),

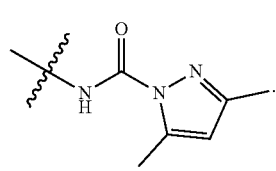

formula (2)

7. The anti-staining fabric of claim 4, wherein the base cloth has a plurality of yarns interwoven with each other, and the anti-staining resin wraps each of the yarns.

8. The anti-staining fabric of claim 4, wherein the base cloth has at least two layers, and the anti-staining resin is disposed between the two layers of the base cloth.

9. A fabricating method of an anti-staining resin, comprising:
    performing a first thermal process, such that a polyol, a cross-linking agent, and a choline are reacted to form a first mixture, wherein a reaction temperature of the first thermal process is between 90° C. and 120° C.;
    mixing the first mixture and a chain extender, such that a second mixture is formed, wherein the chain extender comprises a first reagent and a second reagent;
    dipping a base cloth in the second mixture, such that the second mixture covers the base cloth and infiltrates into the base cloth; and
    performing a second thermal process, such that the second mixture is reacted to form an anti-staining resin, and the anti-staining resin is disposed on the base cloth, wherein a reaction temperature of the second thermal process is between 120° C. and 150° C.

10. The fabricating method of the anti-staining resin of claim 9, wherein performing the first thermal process comprises:
    performing a thermal process, such that the polyol and the cross-linking agent are reacted to form a first precursor; and
    performing another thermal process, such that the choline and the first precursor are reacted to form the first mixture.

11. The fabricating method of the anti-staining resin of claim 9, wherein a reaction time of the first thermal process is between 20 minutes and 30 minutes, and a reaction time of the second thermal process is between 2 minutes and 5 minutes.

* * * * *